US012623710B2

(12) United States Patent
Bucklin

(10) Patent No.: US 12,623,710 B2
(45) Date of Patent: May 12, 2026

(54) KNEELBOARD FOR TRANSPORTING ACROSS A SURFACE

(71) Applicant: Christopher Bucklin, Yorba Linda, CA (US)

(72) Inventor: Christopher Bucklin, Yorba Linda, CA (US)

( * ) Notice: Subject to any disclaimer, the term of this patent is extended or adjusted under 35 U.S.C. 154(b) by 190 days.

(21) Appl. No.: 18/456,194

(22) Filed: Aug. 25, 2023

(65) Prior Publication Data

US 2025/0065940 A1     Feb. 27, 2025

(51) Int. Cl.
B62B 17/06        (2006.01)
B62B 13/06        (2006.01)

(52) U.S. Cl.
CPC ............ B62B 17/067 (2013.01); B62B 13/06 (2013.01); B62B 17/061 (2013.01)

(58) Field of Classification Search
CPC ......... A45F 4/10; B62B 17/067; B62B 13/06; B62B 17/061
See application file for complete search history.

(56) References Cited

U.S. PATENT DOCUMENTS 3,145,029 A * 8/1964 Ollanketo ............. B62B 13/005
                                                         280/16
3,479,046 A * 11/1969 Thompson ............. B62B 15/00
                                                         280/18

3,580,598 A * 5/1971 de Pauw ................. B62B 15/00
                                                         280/18
3,600,000 A * 8/1971 Bergstrom .............. B62B 15/00
                                                         280/18
3,788,661 A * 1/1974 Hird ........................ B62B 13/08
                                                         280/22

(Continued)

FOREIGN PATENT DOCUMENTS

DE        1964299 A  * 12/1969
DE      19805505 A1 *  8/1999    ............... A45F 4/10
EP       0253858 B1 *  4/1991    ............. B62B 15/00
EP       4257006 A1 * 10/2023    ............. B62B 15/00

(Continued)

OTHER PUBLICATIONS

SE-420184-B English Translation (Year: 1981).*

(Continued)

*Primary Examiner* — Michael T. Walsh
(74) *Attorney, Agent, or Firm* — Ariel S. Bentolila; Bay Area IP Group

(57)              ABSTRACT
The Kneelboard device is for transporting a user across a surface, including handrail parts, runners and a multi-point harness attached together upon a user's kneeling legs, thighs, calves and/or hips, that are configured to be operable for generally maintaining balance and control. A plurality of side wall section(s), a seat portion, and one or more shin well segment(s), wherein the one or more shin well segment(s) are configured to provide a resting position for a user's legs, knees, shins and/or feet. One or more instep portion(s), wherein the one or more instep portion(s) are configured to provide a resting position for a user's instep. A raised back edge portion disposed at an end of the device's interior, and a plurality of underside edge section(s) where each underside edge section may considerably taper inward to allow for at least one of a controlled steering, decelerating, and stopping.

20 Claims, 8 Drawing Sheets

(56) References Cited

U.S. PATENT DOCUMENTS

| | | | | |
|---|---|---|---|---|
| 4,413,832 | A * | 11/1983 | Pendleton | A63C 11/00 |
| | | | | 280/18 |
| 4,561,664 | A * | 12/1985 | Cashmere | A63C 5/03 |
| | | | | 280/18 |
| 4,666,171 | A * | 5/1987 | Sellers | B62B 15/00 |
| | | | | 280/18 |
| 4,676,521 | A * | 6/1987 | Monreal | A63C 9/00 |
| | | | | 280/607 |
| 7,100,927 | B2 * | 9/2006 | Krent | B62B 13/005 |
| | | | | 280/18 |
| 8,128,102 | B1 * | 3/2012 | Brown | A63C 5/03 |
| | | | | 280/18 |
| 9,463,823 | B2 * | 10/2016 | Bucklin | B62B 15/00 |
| 2004/0119254 | A1 * | 6/2004 | Sellers | B62B 15/00 |
| | | | | 280/18.1 |
| 2013/0307233 | A1 * | 11/2013 | Sellers | B62B 15/00 |
| | | | | 280/18.1 |

FOREIGN PATENT DOCUMENTS

| | | | | | |
|---|---|---|---|---|---|
| FR | 2586198 | A1 * | 2/1987 | .......... | A63C 5/0485 |
| SE | 420184 | B * | 9/1981 | | |
| WO | WO-0117839 | A1 * | 3/2001 | ............. | B62B 13/08 |
| WO | WO-2006043077 | A2 * | 4/2006 | .......... | B62B 13/043 |
| WO | WO-2018075348 | A1 * | 4/2018 | ............. | A63C 15/00 |

OTHER PUBLICATIONS

WO-2018075348-A1 English Translation (Year: 2018).*
FR-2586198-A1 English Translation (Year: 1987).*
WO-2006043077-A2 English Translation (Year: 2006).*
WO-0117839-A1 English Translation (Year: 2011).*
EP-4257006-A1 English Translation (Year: 2023).*
EP-0253858-B1 English Translation (Year: 1991).*
DE-1964299-A English Translation (Year: 1969).*
DE-19805505-A1 English Translation (Year: 1999).*
WO-0117839-A1 English Translation (Year: 2001).*

* cited by examiner

KNEELBOARD FOR TRANSPORTING ACROSS A SURFACE

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

BACKGROUND OF THE RELEVANT PRIOR ART

One or more embodiments of the invention generally relate to a transport apparatus for descending down slopes. More particularly, certain embodiments of the invention relate to a riding/transport apparatus or device designed to controllably descend slopes with a rider in a kneeling and/or seated position.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that while typical devices such as sleds, toboggans, inner tubes, plastic disks, etc. are available for activities like skiing and snowboarding, these devices generally do not offer steering and stopping control. And the ones with some types of steering capabilities are usually too heavy and unwieldy to be safely taken up a chairlift or similar ascension device by a rider. For example, such devices are generally intended to only be dragged or hauled up an ungroomed slope by a rider and then ridden down.

Generally, skiing involves a participant tightly strapping fixed boots to skis as well as usually holding a ski pole in each hand. In its entirety, the equipment required for skiing is heavy, awkward, and expensive. When not strapped in, ski boots are difficult to walk in, heavy and often uncomfortable. Snowboarding boots are also heavy, expensive, and specialized just for snowboarding. Ultimately, both skiing and snowboarding involve a participant wearing specialized footwear and fastening them to an apparatus before traversing down a slope. There is a need for a device that requires no such attachment or extra implements where one simply gets on and rides and wears whatever footwear the rider chooses. There is a need to have the ability to controllably ride down the same slopes as with skis or a snowboard but in a different way (i.e., in a seated and kneeling position). There is a need to conveniently and controllably ride down a variety of slopes, including without limitation snow/ice-covered or sand-covered terrain, on an adjustable and detachable device. There is a need for a rider to have the freedom of wearing whatever footwear the rider chooses as well as the ability to use chairlifts or a similar ascension device safely while carrying such device, but if desired, the built-in ability to also conveniently hike up a slope one wishes to ride down. Note that walking up a snow/ice-covered or sand-covered slope in ski boots to ski down the same while holding skis and poles may be very difficult, and for walking up a slope in snowboard boots, one would likely need a snowboard carrier or sling to assist in hiking with the snowboard as there are no built-in straps to a snowboard. And, unlike skiing, no poles are needed.

In view of the foregoing, it is clear that these traditional techniques are not perfect and leave room for more optimal approaches.

BRIEF DESCRIPTION OF THE DRA WINGS

The present invention is illustrated by way of example, and not by way of limitation, in the figures of the accompanying drawings and in which like reference numerals refer to similar elements.

Figure 1:
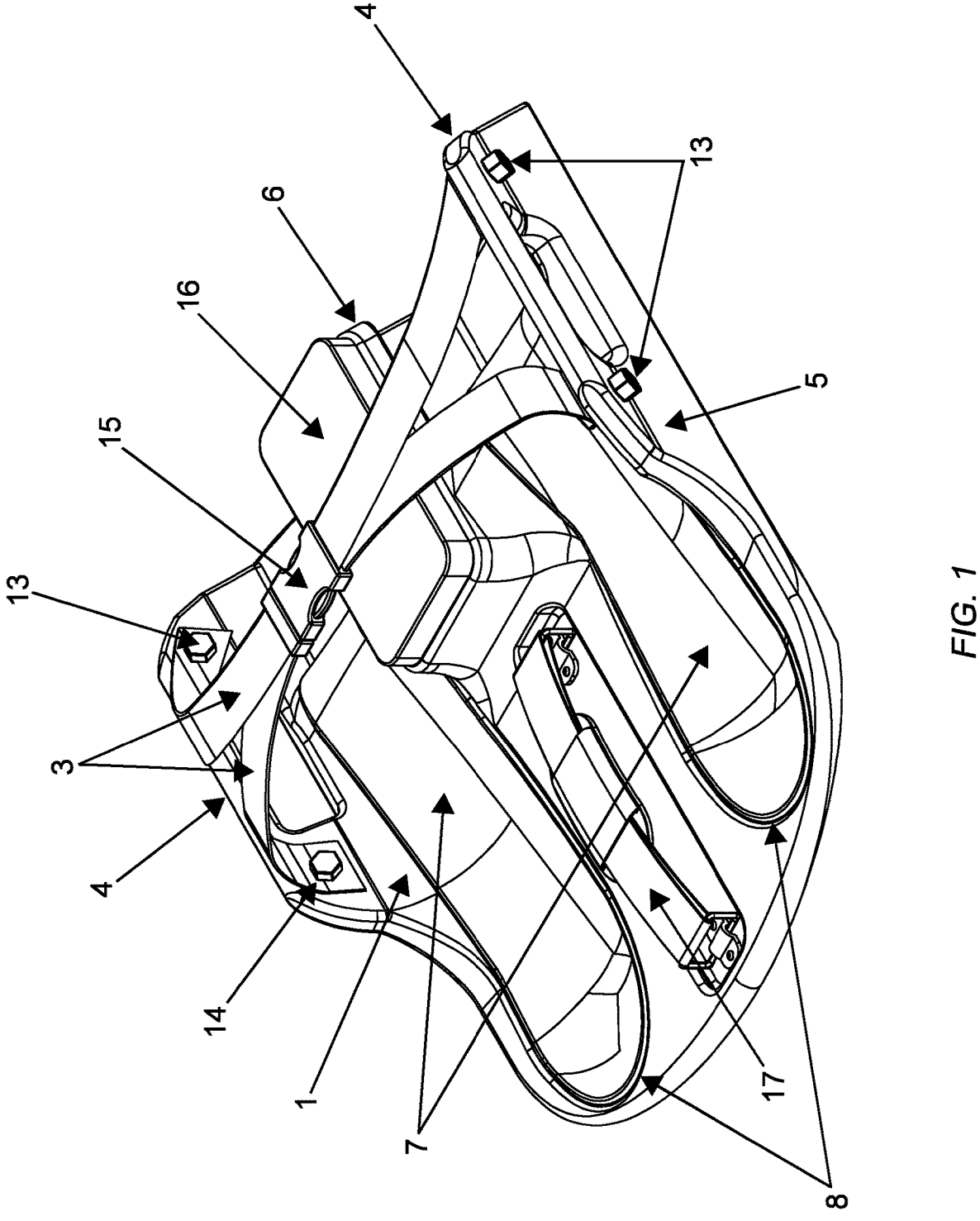
FIG. 1 shows a front oblique view illustration of an exemplary transport device, in accordance with an embodiment of the present invention.

Unless otherwise indicated, illustrations in the figures are not necessarily drawn to scale.

DETAILED DESCRIPTION OF SOME EMBODIMENTS

The present invention is best understood by reference to the detailed figures and description set forth herein.

The "Kneelboard" 1 (FIG. 1) references the new device that is the subject of this patent request.

"Runners" 2 (FIG. 2, FIG. 6 and FIG. 7) refers to the one or more symmetrical edges extending longitudinally from the front of the device to the back to the device that assist a rider in keeping the device straight while transporting across a surface. The Kneelboard 1 may include three (3) such runners 2 on the underside of the device going straight down the length of the device.

"Multi-point harness or restraint" 3 (FIG. 1) or similar references regard the adjustable harness connected to the Kneelboard 1 at three (3) or more points through the two side handles 4 and that tightens across a rider's kneeling legs, thighs, calves and/or hips. In the attached drawings, the Kneelboard's multi-point harness 3 has four (4) connection points to the device, with two (2) through each side handle 4.

Embodiments of the invention are discussed below with reference to the figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications described herein, as these may vary. It is also to be understood that the terminology used herein is used for the purpose of describing particular embodiments only and is not intended to limit the scope of the present invention. It must be noted that as used herein and in the appended Claims, the singular forms "a", "an", and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and Claims should be construed to mean "approximate," rather than "perfect," and may accordingly be employed as a meaningful modifier to any other word, specified parameter, quantity, quality, or concept. Words of approximation include, yet are not limited to, terms such as "substantial", "nearly", "almost", "about", "generally", "largely", "essentially", "closely approximate", etc.

As will be established in some detail below, it is well settled law, as early as 1939, that words of approximation are not indefinite in the Claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is 'substantially' eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) (Depending on its usage, the word "substantially" can denote either language of approximation or language of magnitude). Deering Precision Instruments, L.L.C. v. Vector Distribution Sys., Inc., 347 F.3d 1314, 1323 (Fed. Cir. 2003) (recognizing the "dual ordinary meaning of th[e] term ["] substantially "] as connoting a term of approximation or a term of magnitude"). Here, when referring to the "substantially halfway" limitation, the Specification uses the word "approximately" as a substitute for the word "substantially" (Fact 4). The ordinary meaning of "substantially halfway" is thus reasonably close to or nearly at the midpoint between the forwardmost point of the upper or outsole and the rearwardmost point of the upper or outsole.

Similarly, the term "substantially" is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying "generally parallel" such that the adverb "generally" does not broaden the meaning of parallel. Accordingly, it is well settled that such words of approximation as contemplated in the foregoing (e.g., like the phrase "generally parallel") envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any Claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where the court said [W] e conclude that the ordinary meaning of the phrase "up to about 10%" includes the "about 10%" endpoint. As pointed out by AK Steel, when an object of the preposition "up to" is non-numeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit (e.g., "about 10%") the ordinary meaning is that the endpoint is included.

In the present specification and Claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term 'substantially' serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. The usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter'", see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter"; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other." "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% non-uniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is 'substantially' eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said, "It is realized that 'substantial distance' is a relative and somewhat indefinite term, or phrase, but terms and phrases of this character are not uncommon in patents in cases where, according to the art involved, the meaning can be determined with reasonable clearness."

Hence, for at least the forgoing reason, Applicant(s) submit(s) that it is improper for any examiner to hold as indefinite any Claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar to or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/have been explicitly disavowed or excluded or admitted/implied as prior art in the present specification or incapable of enabling an object/ aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s)/ way(s).

From reading the present disclosure, other variations and modifications will be apparent to persons skilled in the art. The variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicant(s) hereby give(s) notice that new Claims may be formulated to such features and/or combinations of such features during the prosecution of the present Application or of any further Application derived therefrom.

References to "one embodiment," "an embodiment." "example embodiment." "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," "in an exemplary embodiment." or "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/ services thereof (as opposed to sellers/vendors or manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling. vending, manufacturing, marketing, merchandising, distributing, service providing, and the like thereof.

References to "person", "individual", "human", "a party", "animal", "creature", or any similar term, as used herein, even if the context or particular embodiment implies a living user, maker, or participant, it should be understood that such characterizations are solely by way of example, and not limitation, in that it is contemplated that any such usage, making, or participation by a living entity in connection with making, using, and/or participating, in any way, with embodiments of the present invention may be substituted by such similar characterizations performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. The invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

The following paragraphs provide definitions and/or context for terms found in this disclosure (including the appended Claims):

The terms "comprising", "contain" and variations of them are open-ended and mean "including but not limited to". When employed in the appended Claims, this term does not foreclose additional structure or steps. Consider a claim that recites: "A memory controller comprising a system cache . . . " The claim does not foreclose the memory controller from including additional components (e.g., a memory channel unit, a switch, etc.).

Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform (ing) the task even when the specified mechanisms/unit/ circuit/component is not currently operational (e.g., is not on). The mechanisms/units/circuits/components used with the "configured to" or "operable for" language include hardware (e.g., mechanisms, structures, electronics, circuits, memory storing program instructions executable to implement the operation, etc.). Reciting that a mechanism/unit/circuit/component is "configured to" or "operable for" perform(ing) one or more tasks is expressly intended not to invoke 35 U.S.C. sctn. 112, sixth paragraph, for that mechanism/unit/circuit/component. "Configured to" may also include adapting a manufacturing process to fabricate devices or components that are adapted to implement or perform one or more tasks.

As used herein, "based on" is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and Claims are to be understood as being modified in all instances by the term "about." Accordingly, unless indicated to the contrary, the numerical parameters set forth in the following specification and attached Claims are approximations that may vary depending at least upon a specific analytical technique.

The term "comprising." which is synonymous with "including." "containing." or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any Claim of the present invention which claims an embodiment "consisting essentially of" or "consisting of" a certain set of elements of any herein described embodiment, it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consist essentially of a certain functional combination of elements of any described embodiment(s) to the exclusion of any others not set forth therein, and the invention thus covers all such exclusive embodiments as if they were each described herein.

With respect to the terms "comprising." "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of." or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary, a variety of optional components is described to illustrate the wide variety of possible embodiments of the present invention.

As is well known to those skilled in the art, many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and Claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Some embodiments of the present invention and variations thereof relate to a device or apparatus designed to controllably descend slopes with a rider in a kneeling and/or seated position. In one embodiment of the present invention, the device may be used to transport a user across a surface in a simultaneous kneeling and/or seated position. The user may start transporting across a surface through a kneeling and/or seated start from a stationary position, or may start transporting by walking, jogging, running, or sprinting forward behind the device while holding on to the device's side handles 4 or the device's side walls 5, and such propelling user may, while in motion, then mount the device in the kneeling and/or seated position.

In some embodiments, the device may transport across a surface with a user seated on a seat portion 6 with their legs facing forward and their feet resting within the end of shin well segment(s) 7 toward the nose, and a user may hold on to side handles 4 or side walls 5 for stability. Moreover, a seated user could also be propelled forward from a stationary position by another user walking, jogging, running or sprinting forward behind the seated user that is holding onto side handles 4 or side walls 5, and such propelling user may either release the seated user and device while in motion onto the surface, or after propelling the seated user may mount the device while in motion by placing the propelling user's feet on the back of the device's interior behind the seated user while the propelling user is still holding side handles 4 or side walls 5 for stability.

In other embodiments, the device may transport a user across a surface, with or without a harness 3, with a mounted user holding onto an exterior handhold that is pulling the user and device forward through an exterior force (e.g., another person or sled dog pulling a rope, a snowmobile with a tow line, or holding onto a mechanically pulled cable line).

In further embodiments, the device's main body 1 may be composed of durable thermoplastic including, without limitation, polyethylene (whether ultra-high-molecular-weight polyethylene, high-density polyethylene, medium-density polyethylene, low-density polyethylene, or linear low-density polyethylene), or polypropylene of varying thickness through rotational molding. The device's main body 1 may be solid, hollow, or filled including, without limitation, filled with hardening foam.

In additional embodiments, the device may implement one or more shin wells 7 that are concaved inward to the device to better fit the natural rounded shape of a user's shins, knees and/or instep. The shin wells 7 may be tilted at various angles relative to the device's main body 1. The shin wells 7 may be parallel to one another or set at various angles emanating or extending from the seat 6. The shin wells 7 may be unpadded or have shaped padding or foam 8 of varying thicknesses added for a user's comfort and safety. The shaped padding or foam 8 may be attached to the main body 1 using any manner of adhesion.

In some embodiments, the device may implement one or more concave instep portion(s) 9 to better fit a natural rounded shape of a user's instep. Instep wells 9 may include one or more instep wells tilted at various angles relative to the main body 1. Instep wells 9 may be parallel to one another or set at various angles emanating or extending from the seat 6. Instep wells 9 may be unpadded or have shaped padding or foam 8 of varying thicknesses added for a user's comfort and safety. Shaped padding or foam 8 may be attached to the main body 1 using any manner of adhesion. Shaped instep padding or foam may be part of the shaped shin well padding or foam 8 described above or may be separated.

In some embodiments, the device may implement one or more raised edges or bumps 10 at the back of the device's interior behind a mounted user's feet. Raised edges or bumps 10 help a user feel the very end of the device's interior with their feet and help to provide the user a surface to press off against to keep properly mounted on the device. Raised edge(s) or bump(s) 10 may be of various heights, lengths, thicknesses, and angles.

In some embodiments, the back of the device behind a mounted user's feet may be designed with a raised back edge portion 10 that increasingly emanates or extends further away from the surface toward the back of the device.

In some embodiments, one or more side handles 4 may be raised straight up or tilted inward or outward at various angles relative to the main body 1. The gripping surface of one or more side handles 4 may be smooth, textured or padded.

In some embodiments, the underside of the device may feature one or more longitudinal edges (i.e., runners) or bumps 2 to assist a rider in keeping the device straight while transporting across a surface. Longitudinal edges (i.e., runners) or bumps 2 may be of equal or varying heights, lengths, thicknesses, and angles.

In some embodiments, the device may implement metal strips, rails, or underside edge reinforcement(s) 11 including, without limitation, stainless steel on the main body's underside edge section(s) 12 to assist in gripping a surface when turning or stopping, and to prevent hastened wear on underside edge section(s) 12. Underside edge reinforcement(s) 11 may be flat metal strips or rails, or alternatively metal strips bent at various angles to contour to underside edge section(s) 12 horizontally and vertically. The metal strips, rails, or underside edge reinforcement(s) 11 may be attached to the device during the molding process or attached separately after the main body 1 is molded using various means (including, without limitation, screws and threaded inserts/threaded bushings, or any manner of adhesion). The metal strips, rails, or underside edge reinforcement(s) 11 may be of varying lengths, widths, thickness, and angles.

In some embodiments, the device may implement a multi-point harness or restraint 3 over a user's kneeling legs, thighs, calves and/or hips. The harness or restraint 3 is attached to the main body 1 through, on or around side handles 4. The harness or restraint 3 over a user's kneeling legs, thighs, calves and/or hips may be composed of two or more strap pieces, with each strap piece being attached to the main body 1 through, on or around side handles 4. Any strap piece of such harness or restraint 3 may be fixed length, adjustable/variable length, elastic, or any combination thereof. When the strap pieces are joined, such multi-point harness or restraint 3 may further be adjustable by a user to tighten or release extra slack over a user's kneeling legs, thighs, calves and/or hips. Each strap piece of such multi-point harness or restraint 3 may vary in terms of length, width, and thickness, and be padded or unpadded. One or more strap pieces of such harness or restraint 3 may be configured in various ways and adjustably attached to the device so that the complete harness or restraint 3 is anchored to the device at three or more points. Individual strap pieces may be detachable from the device and remaining harness 3 so that the latter is composed of as little as two strap pieces anchored to the device.

In some embodiments, a multi-point harness or restraint 3 may be attached to the main body's side handles 4 by various means including, without limitation, a threaded fastener 13 such as a nut and bolt, hook and loop, belt latch, snap fasteners, or magnets. If any attachment point utilizes a threaded fastener 13, such attachment may or may not include a washer, bolt plate and/or similar implement 14 between harness 3 and threaded fastener 13 to engage the pieces together and/or distribute load forces at such attachment point.

In some embodiments, the strap pieces of a multi-point harness or restraint 3 may be attached together by various means including, without limitation, through a release buckle 15, snap fasteners, magnets, hook and loop, belt latch, or stitched together.

In some embodiments, the device may use two or more separate harnesses or restraints 3 over a user's kneeling legs, thighs, calves and/or hips (with each harness 3 composed of two or more strap pieces anchored to the device).

In some embodiments, the device may comprise a Kneelboard 1. The Kneelboard 1 is a steerable and stoppable riding apparatus designed to controllably descend slopes, including without limitation snow/ice-covered slopes, sand-covered slopes, grass-covered slopes, dirt-covered slopes, and artificial slopes, with a rider in a kneeling and/or seated position. The Kneelboard 1 may provide:

1) The ability to controllably descend slopes, including without limitation snow/ice-covered slopes, sand-covered slopes, grass-covered slopes, dirt-covered slopes, or artificial slopes, in a kneeling and/or seated position, and starting from a kneeling or running start.

2) Turning and stopping performed by the rider leaning weight or twisting their hips and possibly gripping handrail part(s) 4 along each side of the apparatus for balance and control.

3) A rider being attached to the apparatus by an adjustable, multi-point strap 3 connected to side handles 4 and across a user's kneeling legs, thighs, calves and/or hips.

4) Shaped shin wells 7 and durable padding from the rider's instep to knees 8 (and also with a raised padded seat 6 and 16) to allow for a comfortable ride from a kneeling position.

5) A raised seat 6 may relieve some of the weight off the kneeling rider's knees, shins, and feet.

6) Raised edges/bumps 10 at the back of the device's interior behind a mounted user's feet to assist with rider stability and control.

7) Multiple longitudinal edges (i.e., runners) or bumps 2 along the bottom length of the Kneelboard 1 to allow for straight descent, steering and controlled deceleration.

8) Each underside outside edge 12 tapers inward along a centerline extending longitudinally from the front of the device to the back of the device, to allow for more controlled steering, decelerating, and stopping.

9) Each underside edge 12 may be lined with reinforcing strips, rails, and/or edges 11 to assist in carving turns and stopping in rough terrain.

10) Excluding reinforcing edges 11, attached padding 8 and 16 and straps 3 and 17, the entire main body 1 may be composed of durable thermoplastic including, without limitation, polyethylene (whether ultra-high-molecular-weight polyethylene, high-density polyethylene, medium-density polyethylene, low-density polyethylene, or linear low-density polyethylene), or polypropylene).

11) Lightweight construction that may allow an average man, woman, or young adult to hold the Kneelboard 1 up by one arm by using a padded holding strap implement 17 along the top-front of the device.

12) An adjustable holding strap 17 may allow a rider to carry the Kneelboard 1 like a backpack (which in turn allows the rider to conveniently transport the device, including hiking up a snow/ice-covered slope, sand-covered slope, grass-covered slope, dirt-covered slope, or artificial slope, to be ridden where there is no chairlift or similar ascension device). The shoulder or holding strap 17 may be fixed length, adjustable/variable length, elastic, or any combination thereof, and may be padded or unpadded.

In additional embodiments, the adjustable multi-point harness 3 of the Kneelboard 1 may be fully-removable from the Kneelboard 1 and therefore interchangeable should variations of such harness 3 exist, and alternatively, such harness 3 could be removed altogether and the Kneelboard 1 could be used without it, particularly on even slopes or slopes with a mild grade. Winter gear and equipment typical of skiing, snowboarding and other winter activities (e.g., helmet, gloves, goggles, ski jacket, etc.) may be used with the Kneelboard 1. Other products specifically designed for the Kneelboard 1 may include specialized Kneelboard pants as well as Kneelboard shoes. Ancillary decorative items like lights, stickers, and other similar embellishments, as well as photo and video camera mounts, may be used in conjunction with the Kneelboard 1.

In other embodiments, the Kneelboard 1 may include (i) the main body 1 rotationally molded, (ii) with reinforcement strips 11 affixed on the underside's outside edges 12, (iii) the separately molded padded seat 16 and shin well padding 8 all attached, (iv) a padded shoulder strap 17 already affixed to the main body 1, and (v) an adjustable multi-point harness 3 already affixed to the main body 1. The Kneelboard 1 may be sold without one or more of any such components so such components may be sold separately and subsequently attached. The logical first step of production would be to rotationally mold the main body 1, after which all of the ancillary components previously described are assembled and affixed to the device as described to create the finished product. Alternatively, it may be possible to assemble all or some of the Kneelboard's ancillary parts first, and then rotationally mold the main bodies as needed and attach such ancillary parts to create a finished device once ordered. Effectively, there is no "shelf-life" to the main body 1 or any component of this device and all of the same may be properly stored for years without any degradation or loss of effectiveness.

In a further embodiment, the device may be used to transport a user across a surface in a simultaneous kneeling and/or seated position. The user may start transporting across a surface through a kneeling and/or seated start from a stationary position, or may start transporting by walking, jogging, running, or sprinting forward behind the device while holding on to side handles 4 or side wall sections 5, and the propelling user may, while in motion, then mount the device in the kneeling and/or seated position. The transporting user may or may not then transport across a surface using a harness 3. In addition to transporting one kneeling and/or seated user across a surface, the device may transport across a surface with a user seated on the seat 6 with their legs facing forward and their feet resting within the end of shin wells 7 toward the nose, and the user may hold on to side handles 4 or side walls 5 for stability. Moreover, a seated user may be propelled forward from a stationary position by another user walking, jogging, running or sprinting forward behind the seated user that is holding onto side handles 4 or side walls 5, and the propelling user may either release the seated user and device while in motion onto the surface, or after propelling the seated user may mount the device while in motion by placing the propelling user's feet on the back of the device's interior behind the seated user while the propelling user is still holding side handles 4 or side walls 5 for stability. In addition to transporting a user across a sloped surface via gravity, the device may transport a user across a surface, with or without a harness 3, with a mounted user holding onto an exterior handhold that is pulling the user and device forward through an exterior force (e.g., another person or sled dog pulling a rope, a snowmobile with a tow line, or holding onto a mechanically pulled cable line).

In some embodiments, the device may implement a multi-point harness or restraint 3 over a user's kneeling legs, thighs, calves and/or hips. A harness or restraint 3 is attached to the main body 1 through, on or around side handles 4. One or more strap pieces of the harness or restraint 3 may be configured in various ways and attached to the device so that the complete harness or restraint 3 is anchored to the device at three or more points. Individual strap pieces may be detachable from the device and remaining harness 3 so that the latter is composed of as little as two strap pieces anchored to the device. Any strap piece of the harness or restraint 3 may be fixed length, adjustable/variable length, elastic, or any combination thereof. When the strap pieces are joined, the multi-point harness or restraint 3 may further be adjustable by a user to tighten or release extra slack over a user's kneeling legs, thighs, calves and/or hips. A harness or restraint 3 over a user's kneeling legs, thighs, calves and/or hips may be composed of two or more strap pieces, with each strap piece being attached to the main body 1 through, on or around side handles 4. Each strap piece of multi-point harness or restraint 3 may vary in terms of length, width and thickness, and be padded or unpadded. A multi-point harness or restraint 3 may be attached to the main body's side handles 4 by various means including, without limitation, a threaded fastener 13 (e.g., a nut and bolt), hook and loop, belt latch, snap fasteners, or magnets. If any attachment point utilizes a threaded fastener 13, the attachment may or may not include a washer, bolt plate and/or similar implement 14 between harness 3 and threaded fastener 13 to engage the pieces together and/or distribute load forces at the attachment point. The strap pieces of multi-point harness or restraint 3 may be attached together by various means including, without limitation, through a release buckle 15, snap fasteners, magnets, hook and loop, belt latch, or stitched together. The device may use two or more separate harnesses or restraints 3 over a user's kneeling legs, thighs, calves and/or hips with each harness 3 composed of two or more strap pieces anchored to the device.

In some embodiments, one or more of side handles 4 may be raised straight up vertically or tilted inward or outward at various angles relative to the main body 1. The gripping surface of one or more of side handles 4 may be smooth, textured or padded. The device may implement one or more shin wells 7 that are concaved inward to the device to better fit the natural rounded shape of a user's shins, knees and/or instep. Shin wells 7 may be tilted at various angles relative to the device's main body 1. Shin wells 7 may be parallel to one another or set at various angles emanating or extending from the seat 6. Shin wells 7 may be unpadded or have shaped shin well padding or foam 8 of varying thicknesses added for a user's comfort and safety. Shaped padding or foam 8 may be attached to the main body 1 using any manner of adhesion. The device may implement one or more concave instep wells 9 to better fit the natural rounded shape of a user's instep. Instep wells 9 may be tilted at various angles relative to the device's main body 1. Instep wells 9 may be parallel to one another or set at various angles emanating or extending from the seat 6. Instep wells 9 may be unpadded or have shaped padding or foam 8 of varying thicknesses added for a user's comfort and safety. Shaped padding or foam 8 may be attached to the main body 1 using any manner of adhesion. Shaped instep padding or foam may be part of the shaped shin well padding or foam 8 described above or may be separated.

In some embodiments, the device may affix strips, rails, or reinforcements 11 on the main body's underside outside edges 12 to assist in gripping a surface when turning or stopping, and to prevent hastened wear on underside outside edges 12. Reinforcements 11 may be flat strips or rails, or alternatively strips bent at various angles to contour to underside outside edges 12 horizontally and vertically. Reinforcement strips, rails or edges 11 may be attached to the device during the molding process or attached separately after the main body 1 is molded using various means (including, without limitation, screws and threaded inserts/threaded bushings, or any manner of adhesion). The strips, rails or underside edge reinforcement(s) 11 may be of varying lengths, widths, thickness, and angles. The strips, rails, or underside edge reinforcement(s) 11 may be made of metal (including, without limitation, stainless steel, or aluminum), ceramic, plastic, carbon fiber, or other materials of similar strength and durability. The underside of the device may feature one or more longitudinal edges (i.e., runners) or bumps 2 to assist a rider in keeping the device straight while transporting across a surface. Longitudinal edges (i.e., runners) or bumps 2 may be of equal or varying heights, lengths, thicknesses, and angles. The device may implement one or more raised edges or bumps 10 at the back of the device's interior behind a mounted user's feet. Raised edges or bumps 10 help a user detect the very end of the device's interior with their feet and help to provide the user a surface to press off against to keep properly mounted on the device. Raised edge(s) or bump(s) 10 may be of various heights, lengths, thicknesses, and angles. The back of the device behind a mounted user's feet may be designed with a raised back edge 10 that increasing emanates or extends further away from the surface toward the back of the device. A shoulder strap 17 may be fixed length, adjustable/variable length, elastic, or any combination thereof, and may be padded or unpadded. The device's main body may be composed of durable thermoplastic including, without limitation, polyethylene whether ultra-high-molecular-weight polyethylene, high-density polyethylene, medium-density polyethylene, low-density polyethylene, or linear low-density polyethylene), or polypropylene of varying thickness through rotational molding. The device's main body 1 may be solid, hollow, or filled including, without limitation, filled with hardening foam.

In additional embodiments, the Kneelboard 1 is a controllable riding apparatus designed to descend all manner of slopes, including without limitation snow/ice-covered slopes, sand-covered slopes, grass-covered slopes, dirt-covered slopes, and artificial slopes. The rider may travel in a kneeling and/or seated position with his/her weight on shaped padding 8 from the rider's instep to knees with some weight also on a raised padded seat or foam 16. The underside's multiple longitudinal runners 2 keep the rider and device straight while descending a slope. The rider controls, turns, slows down, and stops by leaning weight or twisting their hips on one side of the Kneelboard 1 or the other. As the rider steers deeper into a turn, underside outside edges 12 along the bottom length of the Kneelboard 1 may carve deeper into the transporting surface causing the rider and Kneelboard 1 to turn, and if continued, turn sharper and, if continued further, to come to a sliding stop. Along with shifting weight from side to side, the rider may also maintain balance and control by gripping handrails 4 along the length of each side of the apparatus. The Kneelboard 1 is designed to be light and with a carrying strap 17 to allow the user to safely ride a chairlift or similar ascension device. The Kneelboard's carrying strap 17 may allow the rider to carry the Kneelboard 1 like a backpack so he/she can more easily hike up a slope to be ridden where there is no ascension device.

The present invention will now be described in detail with reference to embodiments thereof as illustrated in the accompanying drawings.

FIG. 1 shows a front oblique view illustration of an exemplary transport device, in accordance with an embodiment of the present invention. In one embodiment of the present invention, the transport device may comprise, without limitation, the main body or Kneelboard 1, one or more longitudinal edges (i.e., runners) or bumps 2, harness or restraint 3 with a release buckle 15, one or more side handles 4, side walls 5, raised seat 6, one or more shin wells 7, shaped padding or foam 8, instep wells 9, raised back edge 10, strips, rails or edges 11, underside edges 12, threaded fastener 13, washer, bolt plate or similar implement 14, seat padding or foam 16, and holding strap 17.

In some embodiments, the main body or Kneelboard 1 may be composed of, without limitation, durable thermoplastic including, without limitation, polyethylene (whether ultra-high-molecular-weight polyethylene, high-density polyethylene, medium-density polyethylene, low-density polyethylene, or linear low-density polyethylene), or polypropylene of varying thickness through rotational molding.

The main body 1 may be solid, hollow, or filled including, without limitation, filled with hardening foam. A first step of the production may be to rotationally mold the Kneelboard or main body 1. After which reinforcement strips 11 may be affixed on the undersides outside edges 12. A separately molded padded seat 16 and shin padding 8 may be attached. A padded shoulder strap 17 and adjustable multi-point harness 3 may be affixed to the main body 1 to create the finished product.

A harness or restraint 3 may be attached to the main body 1 through, on or around side handles 4. A harness or restraint 3 may be placed over a user's kneeling legs, thighs, calves and/or hips and may be composed of two or more strap pieces, with each strap piece being attached to the main body 1 through, on or around side handles 4. Any strap piece of such harness or restraint 3 may be fixed length, adjustable/ variable length, elastic, or any combination thereof. When the strap pieces are joined, such multi-point harness or restraint 3 may further be adjustable by a user to tighten or release extra slack over a user's kneeling legs, thighs, calves and/or hips. Each strap piece of such multi-point harness or restraint 3 may vary in terms of length, width, and thickness, and be padded or unpadded. One or more strap pieces of such harness or restraint 3 may be configured in various ways and adjustably attached to the device so that the complete harness or restraint 3 is anchored to the device at three or more points. Individual strap pieces may be detachable from the device and the remaining harness 3 so that the latter may be composed of as little as two strap pieces anchored to the device. Side handles 4 may be raised straight up or tilted inward or outward at various angles relative to the main body 1. The gripping surface of side handles 4 may be smooth, textured or padded.

An adjustable holding strap 17 may allow a rider to carry the Kneelboard 1 like a backpack (which in turn allows the rider to conveniently transport the device, including hiking up a snow/ice-covered slope, sand-covered slope, grass-covered slope, dirt-covered slope, or artificial slope, to be ridden where there is no chairlift or similar ascension device). The shoulder strap 17 may be fixed length, adjustable/variable length, clastic, or any combination thereof, and may be padded or unpadded.

In use, the device may transport across a surface with a user seated on a seat 6 with their legs facing forward and their feet resting within the end of shin wells 7 toward the nose, and a user may hold on to side handles 4 or side walls 5 for stability. Moreover, a seated user could also be propelled forward from a stationary position by another user walking, jogging, running or sprinting forward behind the seated user that is holding onto side handles 4 or side walls 5, and such propelling user may either release the seated user and device while in motion onto the surface, or after propelling the seated user may mount the device while in motion by placing the propelling user's feet on the back of the device's interior behind the seated user while the propelling user is still holding side handles 4 or side walls 5 for stability.

In other embodiments, the Kneelboard or main body 1 may be used to transport a user across a surface in a simultaneous kneeling and/or seated position from a stationary position, or may start transporting by walking, jogging, running, or sprinting forward behind the device while holding on to side handles 4 or side walls 5, and the propelling user may, while in motion, then mount the device in the kneeling and/or seated position. The transporting user may or may not then transport across a surface using a harness 3. In addition to transporting one kneeling and/or seated user across a surface, the device may transport across a surface with a user seated on a seat 6 with their legs facing forward and their feet resting within the end of shin wells 7 toward the nose, and the user may hold on to side handles 4 or side walls 5 for stability. Moreover, a seated user may be propelled forward from a stationary position by another user walking, jogging, running or sprinting forward behind the seated user that is holding onto side handles 4 or side walls 5, and the propelling user may either release the seated user and device while in motion onto the surface, or after propelling the seated user may mount the device while in motion by placing the propelling user's feet on the back of the device's interior behind the seated user while the propelling user is still holding side handles 4 or side walls 5 for stability. In addition to transporting a user across a sloped surface via gravity, the device may transport a user across a surface, with or without a harness 3, with a mounted user holding onto an exterior handhold that is pulling the user and device forward through an exterior force (e.g., another person or sled dog pulling a rope, a snowmobile with a tow line, or holding onto a mechanically pulled cable line).

Figure 2:
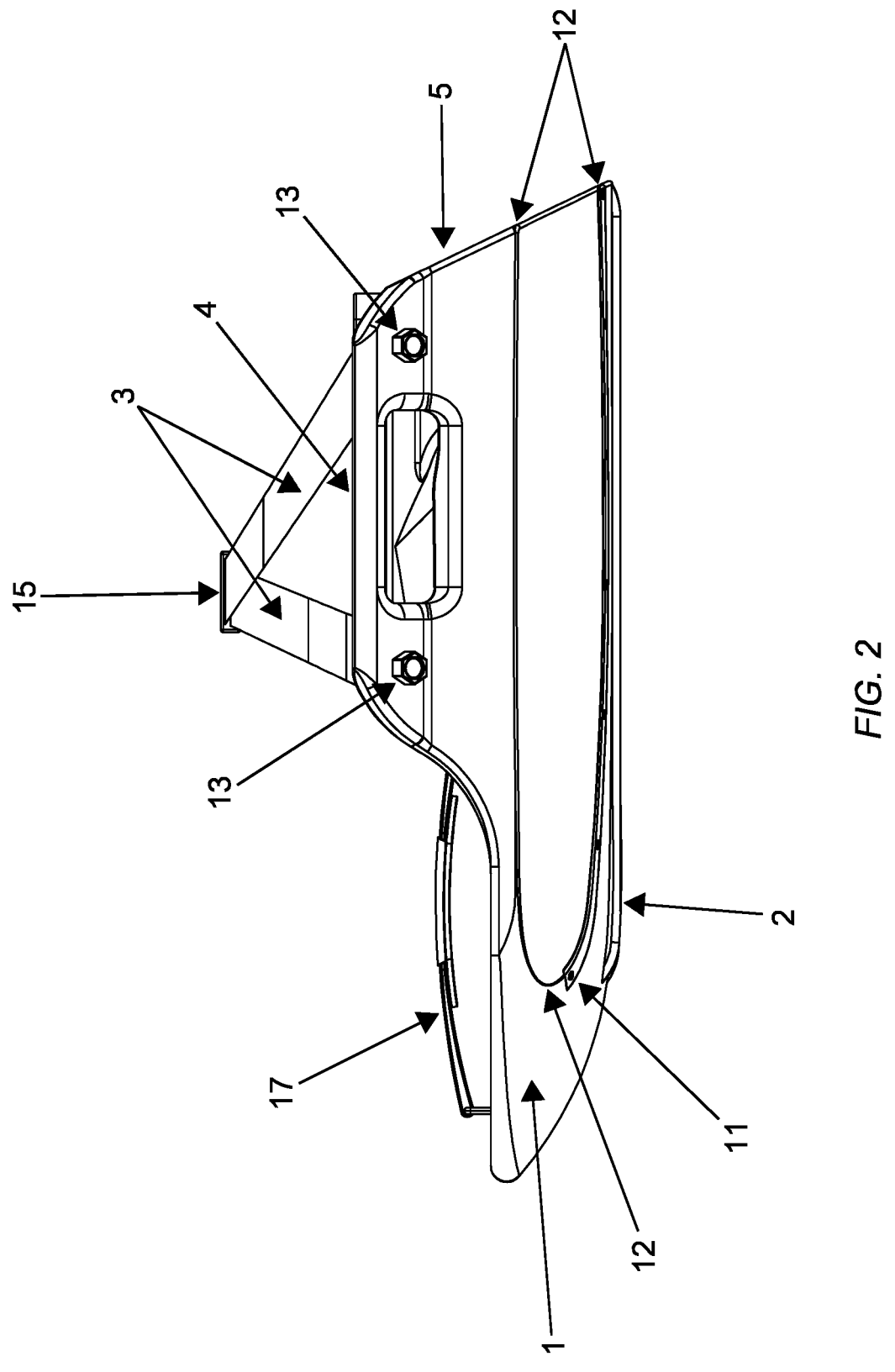
FIG. 2 shows a side view illustration of an exemplary transport device, in accordance with an embodiment of the present invention.

FIG. 2 shows a side view illustration of an exemplary transport device, in accordance with an embodiment of the present invention. In one embodiment of the present invention, the underside of the device may feature one or more longitudinal edges (i.e., runners) or bumps 2 to assist a rider in keeping the device straight while transporting across a surface. Longitudinal edges (i.e., runners) or bumps 2 may be of equal or varying heights, lengths, thicknesses, and angles. Multiple longitudinal edges (i.e., runners) or bumps 2 along the bottom length of the Kneelboard 1 may allow for straight descent, steering and controlled deceleration. Each underside outside edge 12 tapers inward along a centerline extending longitudinally from the front of the device to the back of the device, to allow for more controlled steering, deceleration and stopping. Each underside edge 12 may be lined with reinforcing strips, rails, and/or edges 11 to assist in carving turns and stopping in rough terrain.

Figure 3:
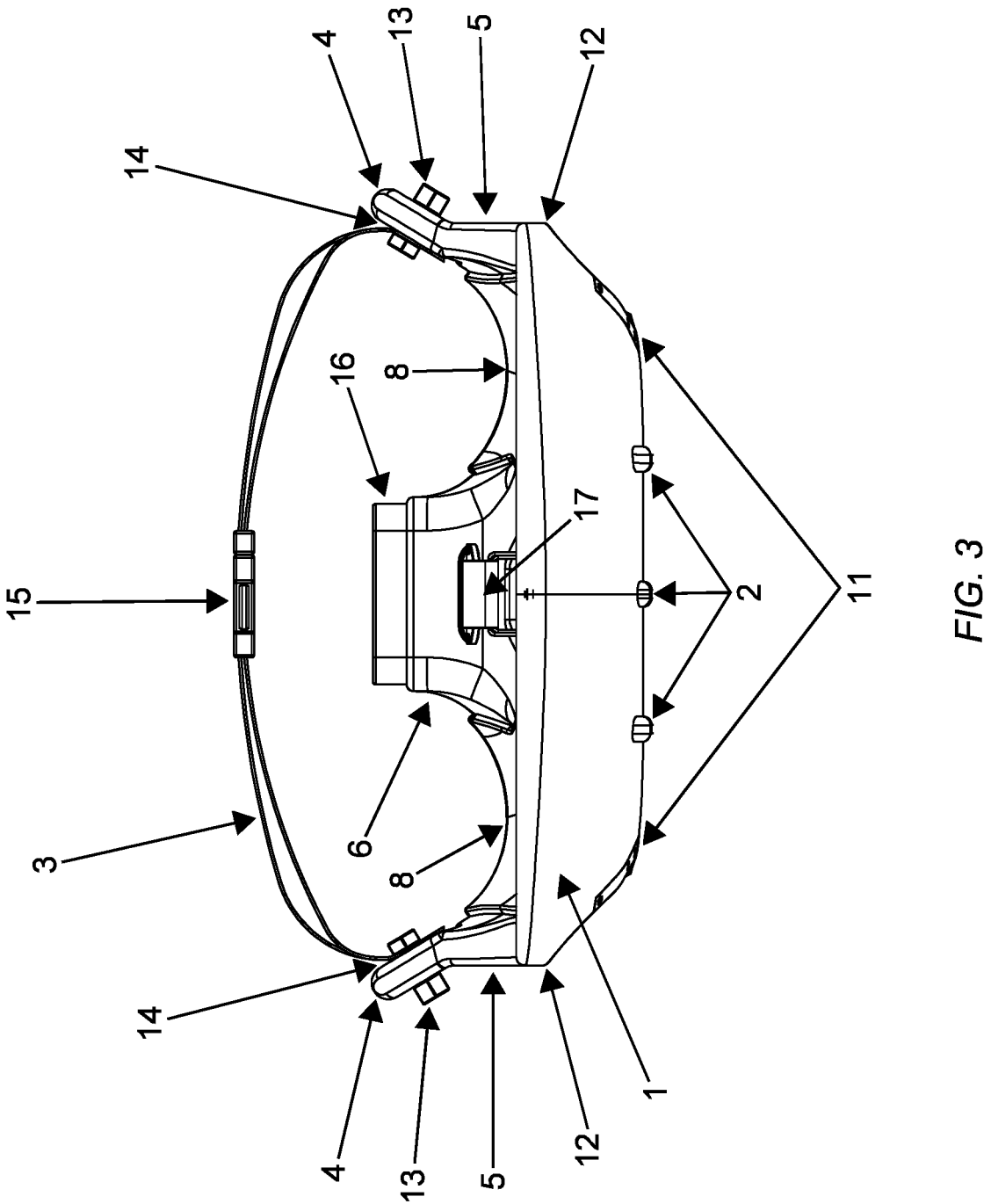
FIG. 3 shows a front view illustration of an exemplary transport device, in accordance with an embodiment of the present invention.

FIG. 3 shows a front view illustration of an exemplary transport device, in accordance with an embodiment of the present invention. In one embodiment of the present invention, shaped padding or foam 8 may be attached to the main body 1 using any manner of adhesion. Shaped instep padding or foam may be part of the shaped shin well padding or foam 8 described above or may be separated. Metal strips, rails, or edges 11 including, without limitation, stainless steel on underside edges 12 may assist in gripping a surface when turning or stopping, and to prevent hastened wear on underside edges 12. Edge reinforcements 11 may be flat metal strips or rails, or alternatively metal strips bent at various angles to contour to underside edges 12 horizontally and vertically. Metal strips, rails, or edges 11 may be attached to the main body 1 during the molding process or attached separately after the main body 1 is molded using various means including, without limitation, screws and threaded inserts/threaded bushings, or any manner of adhesion. Metal strips, rails, or edges 11 may be of varying lengths, widths, thickness, and angles.

Figure 4:
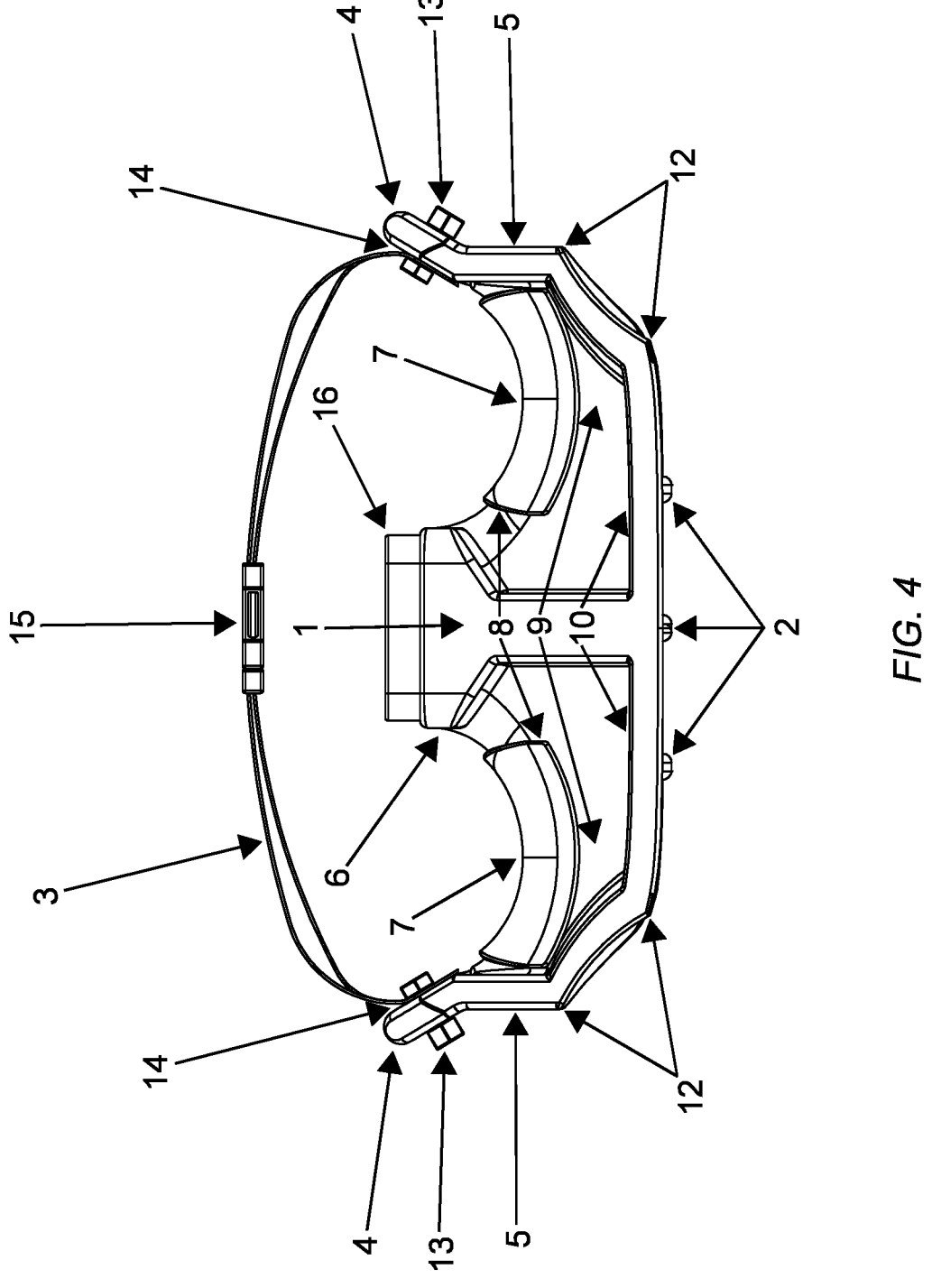
FIG. 4 shows a back view illustration of an exemplary transport device, in accordance with an embodiment of the present invention.

FIG. 4 shows a back view illustration of an exemplary transport device, in accordance with an embodiment of the present invention. In one embodiment of the present invention, one or more shin wells 7 that are concaved inward to the device to better fit a natural rounded shape of a user's shins, knees and/or instep. Shin wells 7 may be tilted at various angles relative to the device's main body 1. Shin wells 7 may be parallel to one another or set at various angles emanating or extending from the seat 6. Shin wells 7 may be unpadded or have shaped padding or foam 8 of varying thicknesses added for a user's comfort and safety. One or more concave instep wells 9 may better fit a natural rounded shape of a user's instep. Instep wells 9 may be tilted at various angles relative to the main body 1. Instep wells 9 may be parallel to one another or set at various angles emanating or extending from the seat 6. Instep wells 9 may be unpadded or have shaped padding or foam 8 of varying thicknesses added for a user's comfort and safety. One or more raised edges or bumps 10 at the back of the device's interior behind a mounted user's feet may help a user feel the very end of the device's interior with their feet and help to provide the user a surface to press off against to keep properly mounted on the device. Raised edge(s) or bump(s) 10 may be of various heights, lengths, thicknesses, and angles. A raised seat 6 and seat padding or foam 16 may relieve some of the weight off the kneeling rider's knees, shins, and feet.

Figure 5:
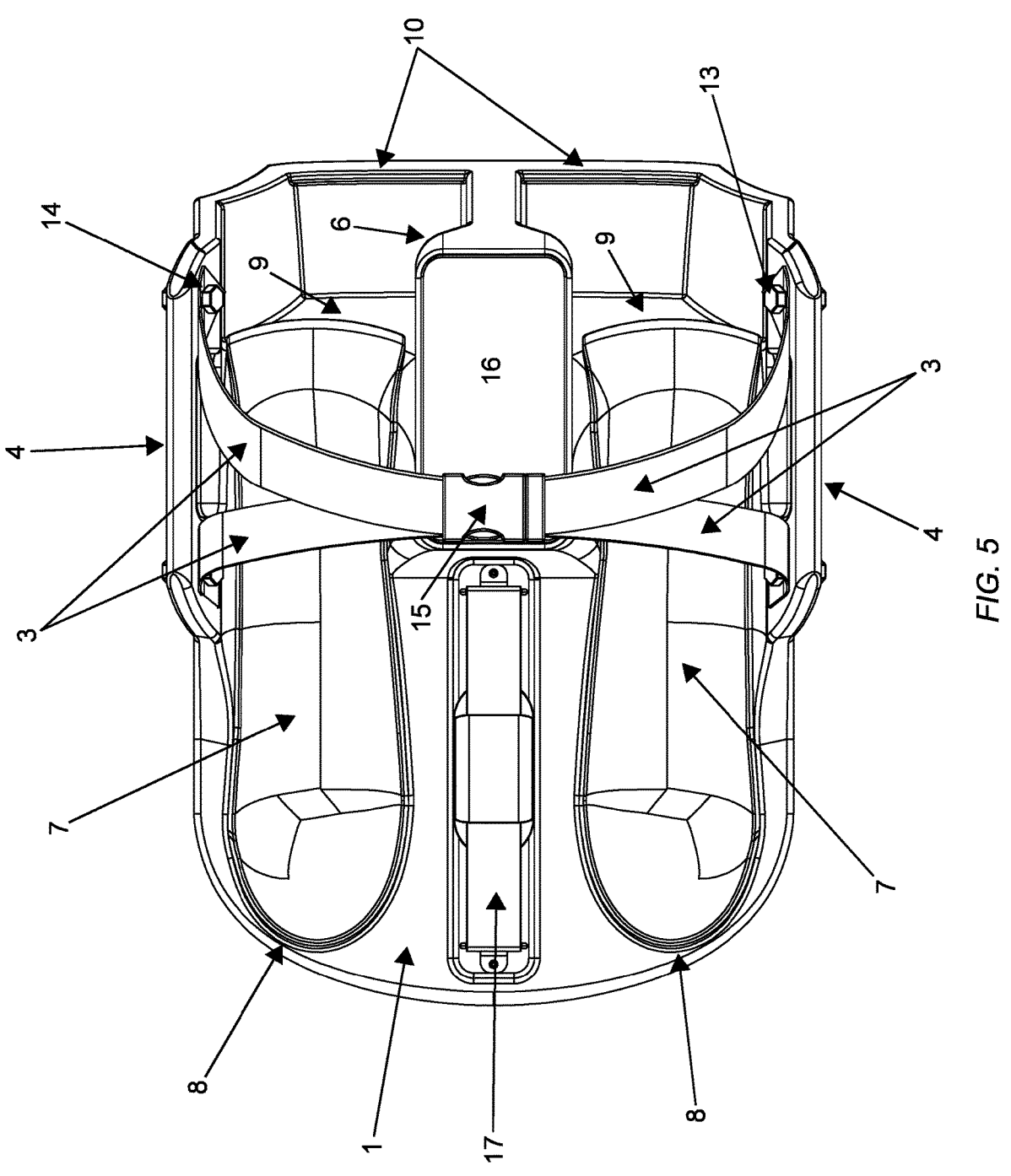
FIG. 5 shows a top view illustration of an exemplary transport device, in accordance with an embodiment of the present invention.

FIG. 5 shows a top view illustration of an exemplary transport device, in accordance with an embodiment of the present invention. In an embodiment of the present invention, raised edges/bumps 10 at the back of the device's interior behind a mounted user's feet may assist the rider stability and control. A raised back edge 10 may increasingly emanates or extends further away from the surface toward the back of the device. Raised edges or bumps 10 may help a user detect the very end of the device's interior with their feet and help to provide the user a surface to press off against to keep properly mounted on the device. Raised edge(s) or bump(s) 10 may be of various heights, lengths, thicknesses, and angles. Shaped shin wells 7 and durable padding from the rider's instep to knees 8 and a raised seat 6 and seat padding 16 may allow for a comfortable ride from a kneeling position. One or more concave instep wells 9 may better fit the natural rounded shape of a user's instep. Instep wells 9 may be tilted at various angles relative to the main body 1. Instep wells 9 may be parallel to one another or set at various angles emanating or extending from the seat 6. Instep wells 9 may be unpadded or have shaped padding or foam 8 of varying thicknesses added for a user's comfort and safety.

Figure 6:
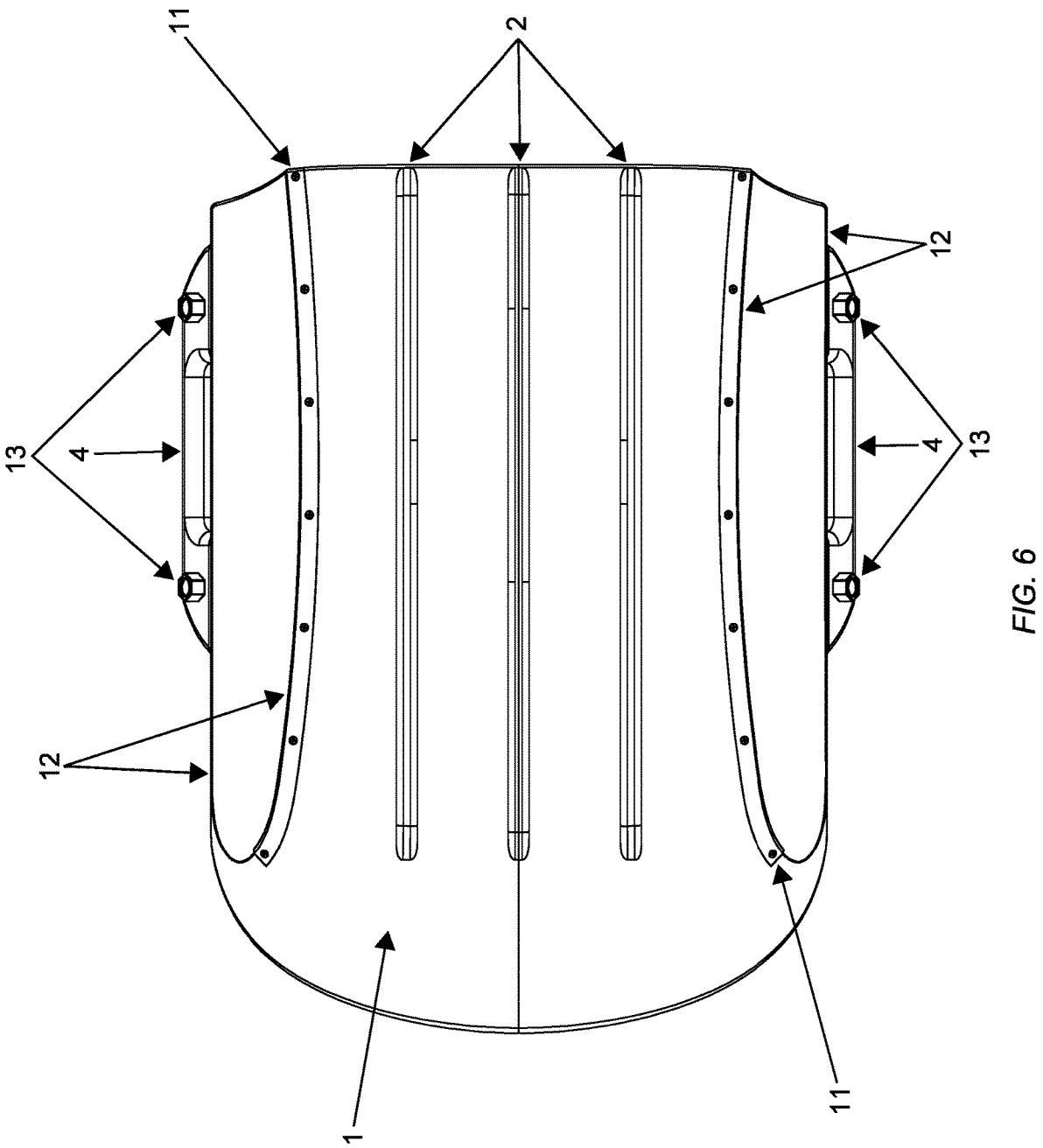
FIG. 6 shows a bottom view illustration of an exemplary transport device, in accordance with an embodiment of the present invention.
Figure 7:
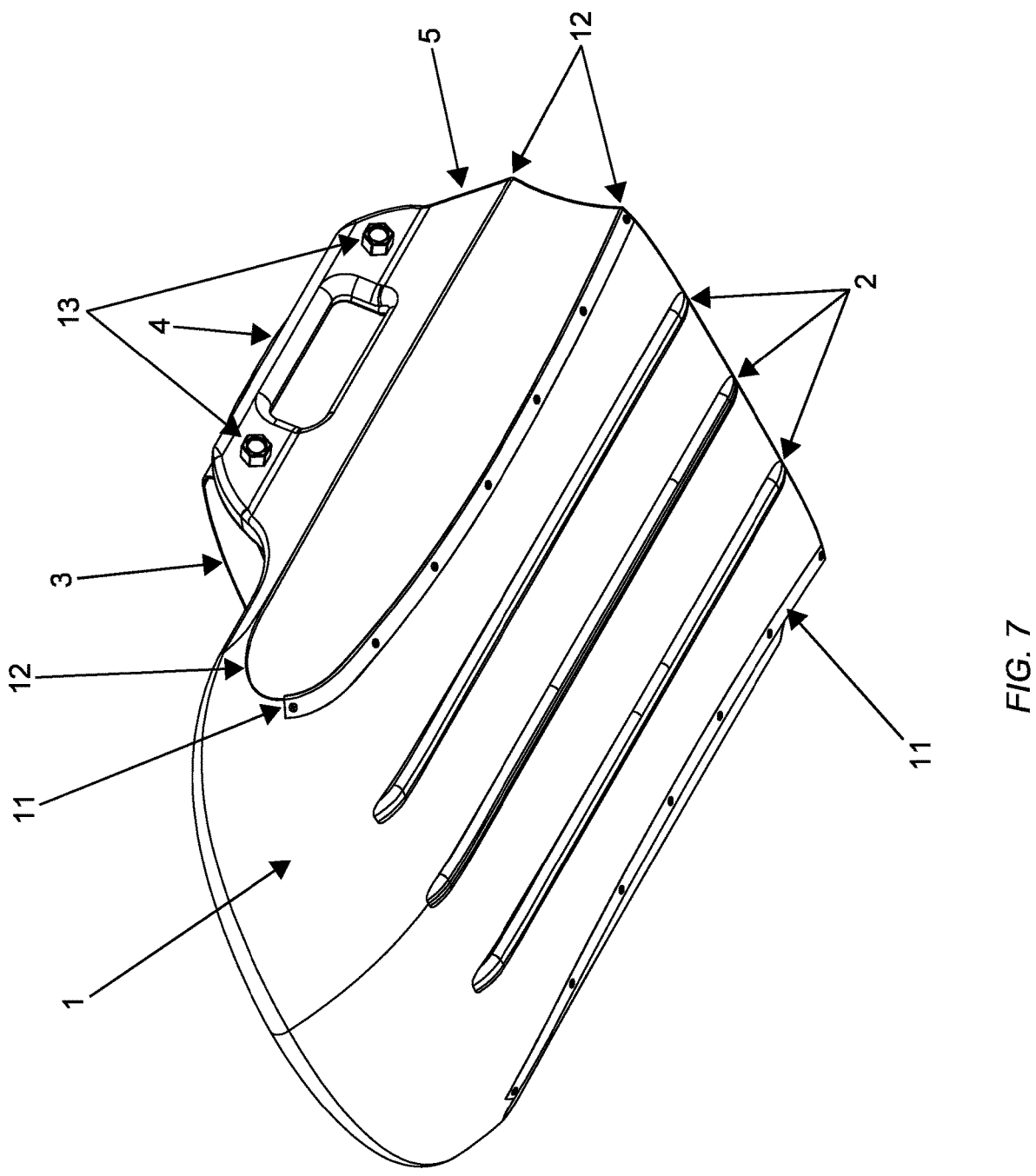
FIG. 7 shows a bottom oblique view illustration of an exemplary transport device, in accordance with an embodiment of the present invention.

FIG. 6 shows a bottom view and FIG. 7 shows a bottom oblique view illustration of an exemplary transport device, in accordance with an embodiment of the present invention. In one embodiment of the present invention, multiple longitudinal runners 2 may keep the rider and device straight while descending a slope. Longitudinal edges (i.e., runners) or bumps 2 may be of equal or varying heights, lengths, thicknesses, and angles. Outside edges 12 along the bottom length of the Kneelboard 1 may carve deeper into the transporting surface causing the rider and Kneelboard 1 to turn, and if continued, turn sharper and, if continued further, to come to a sliding stop. Metal strips, rails, or edges 11 including, without limitation, stainless steel on underside edges 12 may assist in gripping the surface when turning or stopping, and to prevent hastened wear on underside edges 12. Each underside edge 12 may be lined with reinforcing strips, rails, and/or edges 11 to assist in carving turns and stopping in rough terrain. Each underside outside edge 12 tapers inward along a centerline extending longitudinally from the front of the device to the back of the device, to allow for more controlled steering, deceleration and stopping. Edge reinforcements 11 may be flat metal strips or rails, or alternatively metal strips bent at various angles to contour to underside edges 12 horizontally and vertically. Metal strips, rails, or edges 11 may be attached to the main body 1 during the molding process or attached separately after the main body 1 is molded using various means including, without limitation, screws and threaded inserts/threaded bushings, or any manner of adhesion. Metal strips, rails, or edges 11 may be of varying lengths, widths, thickness, and angles.

Figure 8:
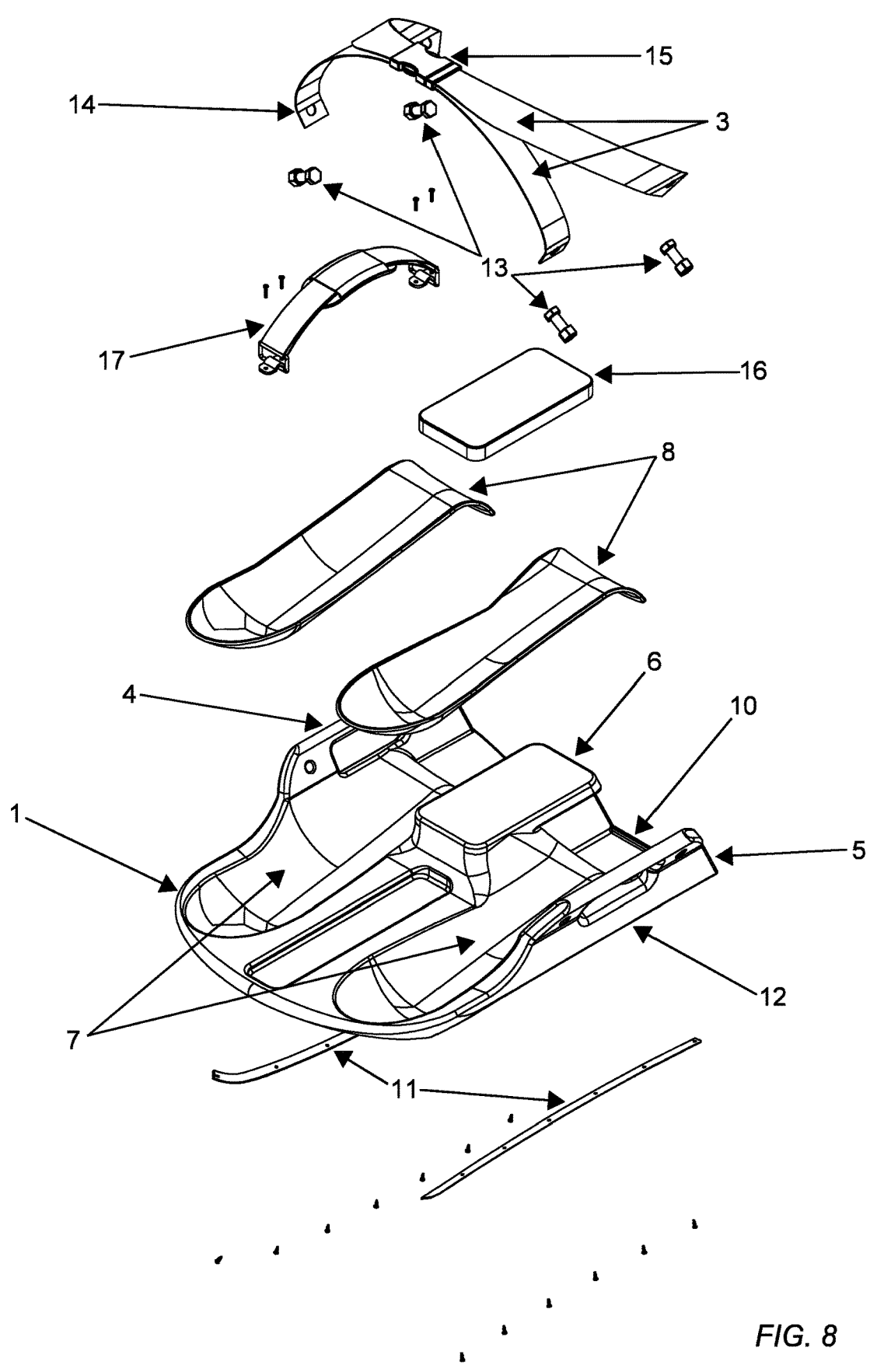
FIG. 8 shows a deconstructed view of an exemplary transport device, in accordance with an embodiment of the present invention.

FIG. 8 shows a deconstructed view of an exemplary transport device, in accordance with an embodiment of the present invention. In one embodiment of the present invention, the main body 1 may be solid, hollow, or filled including, without limitation, filled with hardening foam. First step of the production may be to rotationally mold the Kneelboard or main body 1. The main body or Kneelboard 1 may be composed of, without limitation, durable thermoplastic including, without limitation, polyethylene (e.g., ultra-high-molecular-weight polyethylene, high-density polyethylene, medium-density polyethylene, low-density polyethylene, or linear low-density polyethylene), and/or polypropylene of varying thickness through rotational molding. After which reinforcement strips 11 may be affixed on the underside's outside edges 12. A separately molded padded seat 16 and shin padding 8 may be attached. A padded shoulder strap 17 and adjustable multi-point harness 3 may be affixed to the main body 1 to create the finished product. A harness or restraint 3 may be attached to the main body 1 through, on or around side handles 4. Any strap piece of such harness or restraint 3 may be fixed length, adjustable/variable length, elastic, or any combination thereof. When the strap pieces are joined, such multi-point harness or restraint 3 may further be adjustable by a user. Each strap piece of such multi-point harness or restraint 3 may vary in terms of length, width, and thickness, and be padded or unpadded. One or more strap pieces of such harness or restraint 3 may be configured in various ways and adjustably attached to the device so that such harness or restraint 3 is anchored to the device at three or more points. Individual strap pieces may be detachable from the device and remaining harness 3 so that the latter may be composed of as little as two strap pieces anchored to the device. Side handles 4 may be raised straight up or tilted inward or outward at various angles relative to the main body 1. The gripping surface of side handles 4 may be smooth, textured or padded.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed.

However, 35 USC § 112 (6) requires that structures corresponding to functional limitations interpreted under 35 USC § 112 (6) must be explicitly disclosed in the patent specification. Moreover, the USPTO's examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s) in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate(s) all such functionally corresponding structures and related enabling material herein by reference for the purpose of providing explicit structures that implement the functional means claimed. Applicant(s) request(s) that fact finders during any Claim's construction proceedings and/or examination of patent allowability properly identify and incorporate only the portion(s) of each of these documents discovered during the broadest interpretation search of 35 USC § 112(6) (post AIA 112(f)) limitation, which exist in at least one of the patent and/or non-patent documents found during the course of normal USPTO searching and/or supplied to the USPTO during prosecution. Applicant(s) also incorporate(s) by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any third parties. Applicant(s) also reserve(s) its right to later amend the present application to explicitly include citations to such documents and/or explicitly include the functionally corresponding structures which were incorporated by reference above.

Thus, for any invention element(s)/structure(s) corresponding to functional claim limitation(s), in the below Claims, that are interpreted under 35 USC § 112(6) (post AIA 112(f)), which is/are not explicitly disclosed in the foregoing patent specification, Applicant(s) has/have explicitly prescribed which documents and material to include the otherwise missing disclosure, and have prescribed exactly which portion(s) of such patent and/or non-patent documents should be incorporated by such reference for the purpose of satisfying the disclosure requirements of 35 USC § 112 (6). Applicant(s) note(s) that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a riding/transport apparatus or device according to the present invention will be apparent to those skilled in the art. Various aspects of the invention have been described above by way of illustration, and the specific embodiments disclosed are not intended to limit the invention to the particular forms disclosed. The particular implementation of the riding/transport apparatus or device may vary depending upon the particular context or application. By way of example, and not limitation, the riding/transport apparatus or device described in the foregoing were principally directed to controllably descend slope implementations; however, similar techniques may instead be applied to a device for transporting heavy equipment through snow/ice-covered slopes, sand-covered slopes, grass-covered slopes, dirt-covered slopes or artificial slopes, which implementations of the present invention are contemplated as within the scope of the present invention. The invention is thus to cover all modifications, equivalents, and alternatives falling within the spirit and scope of the following Claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the Claims.

The corresponding structures, materials, acts, and equivalents of all means or step plus function elements in the Claims below are intended to include any structure, material, or act for performing the function in combination with other claimed elements as specifically claimed.

The corresponding structures, materials, acts, and equivalents of all means or step plus function elements in the Claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the Claims.

The following Claims are hereby incorporated into the detailed description, with each Claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A device comprising: at least one or more handrail part(s), said at least one or more handrail part(s) is/are configured to be operable for generally maintaining balance and control; wherein said at least one or more handrail part(s) comprise(s) at least one or more side handles; at least one or more side wall section(s), wherein said at least one or more side wall section(s) is/are configured to support said at least one or more side handle(s):

a harness implement, said harness implement comprises at least two separate harnesses, and wherein said at least two separate harnesses are configured to engage each other;

wherein each of said at least two separate harnesses is engaged to said at least one or more side wall section(s);

a seat portion, said seat portion comprises a raised seat;

at least one or more shin well segment(s), said at least one or more shin well segment(s) is/are configured to concave inward to the device, wherein at least one of said at least one or more shin well segment(s) and seat portion is/are configured to provide a resting position;

at least one or more longitudinal runner(s), wherein said at least one or more longitudinal runner(s) is/are configured to be operable for keeping the device straight while transporting across a surface;

at least one or more underside edge section(s), wherein said at least one or more underside edge section(s) is/are configured to taper inward, andwherein said at least one or more underside edge section(s) is/are configured to support at least one or more side wall section(s)

at least one or more underside edge reinforcement(s), where said at least one or more underside edge reinforcement(s) is/are configured to affix on an outside of said at least one or more underside edge section(s);

at least one or more instep portion(s), said at least one or more instep portion(s) comprise(s) at least one or more concave instep well portion(s), wherein said at least one or more concave instep well portion(s) is/are configured to provide a resting position; and wherein said device is operable for transporting a user across a surface.

2. The device of claim 1, wherein, each of said one or more underside edge section(s) that is/are configured to taper inward is/are operable for allowing at least one of a controlled steering, decelerating, and stopping, and wherein, each of said one or more underside edge section(s) is lined with said one or more underside edge reinforcement(s), said one or more underside edge reinforcement(s) comprise(s) at least one of a reinforcing strip, a rail(s), and stainless steel configured to be operable for allowing at least one of said controlled steering, decelerating, and stopping and/or assisting in carving turns and stopping in rough terrain.

3. The device of claim 1, further comprising a raised back edge portion, wherein said raised back edge portion is configured to emanate or extend away from a surface toward a back of the device.

4. The device of claim 1, wherein said one or more instep well portion(s) comprise at least one of, a concaved concave shape and instep well padding.

5. The device of claim 1, further comprising one or more shin well shape padding for comfort and safety.

6. The device of claim 1, said one or more underside edge reinforcement(s) comprise(s) one or more metal rails and metal strips substantially bent at various angles to contour to said one or more underside edge(s) horizontally and/or vertically.

7. The device of claim 1, further comprising a seat padding, wherein said seat padding is configured to cover said seat portion.

8. The device of claim 1, further comprising a holding strap implement, wherein said holding strap is configured to be operable for allowing a user to carry said device.

9. The device of claim 1, wherein each of said two separate harnesses is engaged to said side wall section along two points at a side of said side handle.

10. The device of claim 9, further comprising at least one or more harness fastener(s), wherein each of said one or more harness fastener(s) comprise:

at least one of, a nut and bolt, a hook and loop, a belt latch and snap fastener; and at least one of, a washer, and a bolt plate configured to engage each harness fastener together or distribute load forces.

11. The device of claim 1, further comprising an instep padding for comfort and safety.

12. A device comprising:

at least one or more handle or handrail part(s), said one or more handle or handrail part(s) is configured to be operable for generally maintaining at least one of, stability, balance and control;

at least one or more side wall section(s), wherein said at least one or more side wall section(s) is/are configured to support said at least one or more handle or handrail part(s);

a seat portion, said seat portion comprises at least one of a raised and padded seat;

at least one or more shin wells, said one or more shin wells is configured to provide a resting position;

a device interior;

a raised back edge portion being disposed at a proximate end of said device interior;

a holding strap, wherein said holding strap comprises an adjustable holding strap that is configured to adjustably carry said device;

a harness implement, said harness implement comprises at least two separate harnesses, and wherein said at least two separate harnesses are configured to engage each other;

wherein each of said two separate harnesses is engaged to said at least one or more side wall section(s);

at least one or more of underside edge section(s), each of said at least one or more underside edge sections is/are configured to taper inward being operable to allow for at least one of a controlled steering, decelerating, and stopping;

at least one or more instep portion(s), said at least one or more instep portion(s) comprise(s) at least one or more concave instep well(s), wherein said one or more concave instep well(s) are configured to provide a resting position;

at least one or more runner(s), wherein said one or more runner(s) is/are at least one or more runner(s), wherein said at least one or more runner(s) is/are;

at least one or more underside edge reinforcements; and wherein said padded seat is configured to be operable for providing comfort and safety.

13. The device of claim 12, wherein said at least two harnesses are configured to be attached together.

14. The device of claim 12, further comprising a shin well padding that is configured to be operable for comfort and safety.

15. A device comprising:

at least one or more handle part(s), said at least one or more handle part(s) is/are configured to be operable for generally maintaining balance and control;

at least one or more side wall section(s); wherein said at least one or more side wall section(s) is/are configured to support said at least one or more handle part(s);

a seat portion, said seat portion comprises at least one of a raised and padded seat;

one or more shin well segment(s), said one or more shin well segment(s) are configured to provide a resting position;

a device interior;

a raised back edge portion being disposed at a proximate end of said device interior;

at least one or more underside edge section(s), wherein said at least one or more underside edge section(s) is/are configured to support said at least one or more side wall section(s), wherein each of said at least one or more underside edge section(s) is further configured to taper inward, and wherein each of said at least one or more underside edge section(s) configured to taper inward is/are operable to allow at least one of a controlled steering, decelerating, and stopping;

at least one or more underside edge reinforcements;

one or more instep portion(s), said one or more instep portion(s) comprise(s) at least one or more concave instep well(s), wherein said at least one or more concave instep well(s) is/are configured to provide a resting position;

a harness or restraint implement, wherein said harness or restraint implement is configured to attach upon a user, said harness comprises at least two separate harnesses, and wherein said at least two separate harnesses are configured to engage each other;

wherein each of said two separate harnesses is engaged to said at least one or more side wall section(s); and wherein said device is operable for transporting a user across a surface.

16. The device of claim 15, further comprising:

one or more runner(s), wherein said one or more runner(s) is/are configured to be operable for keeping the device straight while transporting across a surface;

one or more shin well shaped padding or foam for comfort and safety;

a seat padding or foam for comfort and safety.

17. The device of claim 15, further comprising:

a holding strap implement, wherein said holding strap being operable for allowing a user to carry said device; and an instep padding for comfort and safety.

18. The device of claim 17, wherein said holding strap implement comprises:

an adjustable holding strap to adjustably carry said device; and a holding strap padding for carrying said device.

19. The device of claim 15, further comprising at least one or more harness fastener(s), each of said one or more harness fastener(s) comprise(s):

a threaded harness fastener including at least one of, a nut and bolt, a hook and loop, a belt latch and snap fastener; and at least one of, a washer, and a bolt plate that is configured to engage the fastener together and/or distribute load forces.

20. The device of claim 19, further comprising a shin well padding that is configured to be operable for comfort and safety.

*   *   *   *   *